No. 734,914. PATENTED JULY 28, 1903.
A. H. MARKS.
PNEUMATIC TIRE.
APPLICATION FILED MAR. 31, 1902.
NO MODEL.
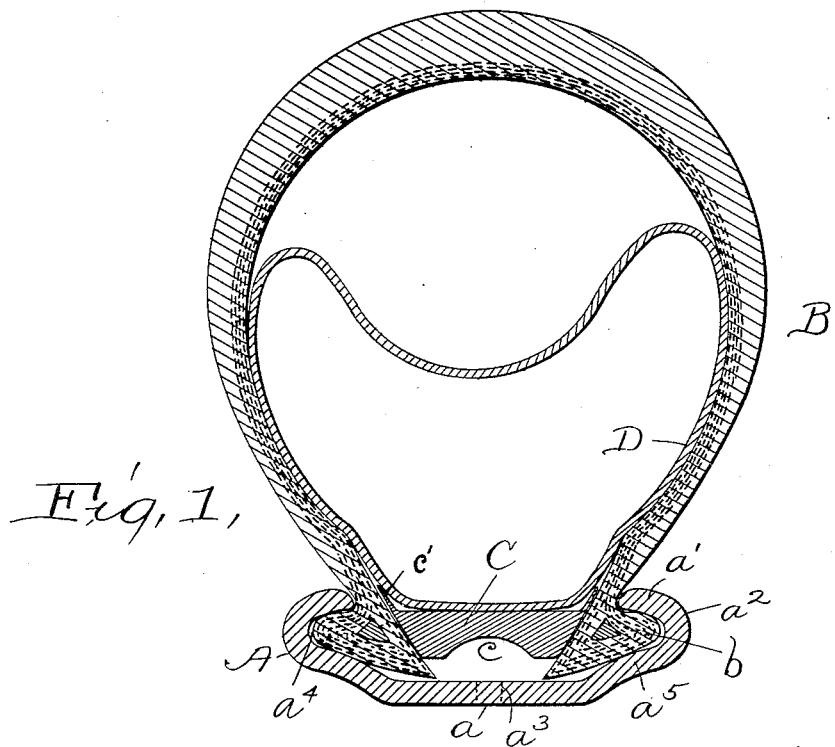
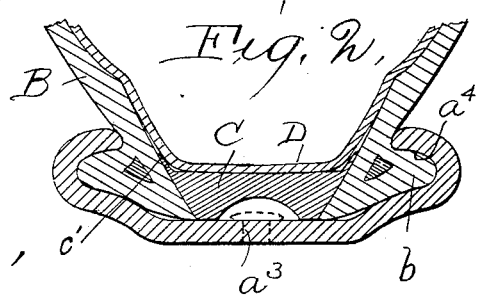
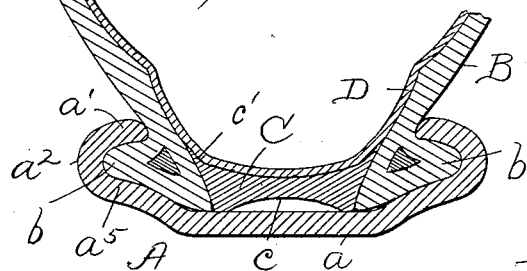
Witnesses.
E. B. Gilchrist
H. W. Wise
Inventor.
Arthur H. Marks,
By his Attorneys,
Thurston & Bates.

No. 734,914.

Patented July 28, 1903.

UNITED STATES PATENT OFFICE.

ARTHUR H. MARKS, OF AKRON, OHIO, ASSIGNOR TO DIAMOND RUBBER COMPANY, OF AKRON, OHIO, A CORPORATION OF WEST VIRGINIA.

PNEUMATIC TIRE.

SPECIFICATION forming part of Letters Patent No. 734,914, dated July 28, 1903.

Application filed March 31, 1902. Serial No. 100,655. (No model.)

*To all whom it may concern:*

Be it known that I, ARTHUR H. MARKS, a citizen of the United States, residing at Akron, in the county of Summit and State of Ohio, have invented a certain new and useful Improvement in Pneumatic Tires, of which the following is a full, clear, and exact description, reference being had to the accompanying drawings.

The invention relates to so-called "detachable pneumatic tires."

The object is to produce at reasonable cost a tire which will maintain itself in operative position upon the wheel-rim without danger that the inflatable core will be injured by the spokes or spoke-nipples which project through the rim.

The invention consists in the construction and combination of parts hereinafter described, and pointed out definitely in the claims.

In the drawings, Figure 1 is a transverse sectional view of said tire when deflated, and Fig. 2 is a similar view when the tire is partly inflated, and Fig. 3 is a similar view when the tire is completely inflated.

Referring to the parts by letters, A represents the metallic rim having a substantially flat or cylindrical portion $a$ midway between its edges. At each side of this flat or cylindrical portion the rim inclines outwardly and its extreme edges $a^2$ are bent over, although not as far as will bring them into parallel relationship with the cylindrical central part $a$ of said rim—that is to say, they have an outward inclination. In the central part of the rim are holes $a^3$, through which pass the spoke-nipples which engage with the spokes of the wheel.

B represents the outer portion or sheath of the tire, which may be of familiar construction. Near its edges it is provided with external beads $b$, adapted to fit in the recesses $a^4$, formed between the bent-over edges $a'$ of $a^4$, and the outwardly-inclined portions $a^5$ thereof. When the sheath is caused to engage with the rim in substantially the manner shown, the inner walls of the edges of the sheath incline toward each other, as shown.

C represents a locking-strip, which may be either in the form of an endless ring or it may be a strip of the proper length bent into ring form, with its ends close together. It may be made of rubber and fabric vulcanized together in a manner well known. This strip is of wedge shape in transverse section and adapted to the wedge-shaped space between the inner faces of the two sides of the sheath. In the inner or lower face of this locking-strip there is a groove $c$ for the accommodation of the spoke-nipples, but somewhat larger than is necessary for that purpose. It will be observed that the sides of the strip C incline and taper toward the rim to fit the correspondingly-inclined inner walls of the sheath. It will be further observed that the side walls of said strip are extended beyond the surface of the same which is remote from the rim to form wings $c'$, thereby extending the bearing-surfaces of said walls on the sheath, making a tighter joint with the same, and preventing the nipping of the inner core between said sheath and said strip.

D represents the inflatable annular core, which is of the ordinary construction. When the parts are assembled, as shown, and the core is inflated, it will force this locking-strip toward the rim and between the proximate faces of the sheath, and thereby spread the edges of the sheath laterally and force the external ribs thereon snugly into the recesses $a^4$ within the overhanging edges $a^2$ of said rim. The disengagement of the edges of the sheath from the rim will thereby be prevented so long as the inner tube or core is inflated, as specified. At all times the described locking-strip lies between the spokes or spoke-fastening devices and the tube D, thereby protecting the latter from injury. This groove $c$ is quite a little deeper than is necessary for the accommodation of the spoke-fastening devices, and therefore the core D, as it is inflated first, drives the locking-strip inward until it engages with the outer face of the rim. When the locking-strip has reached this position and the core is still further inflated, the middle part of the locking-strip—that is to say, the part outside of the groove $c$—is forced downward or inward still farther, and this causes the strip to bend, whereby its lower external edges are forced outward, thereby still further and more efficiently forcing the edges of the sheath into engagement with the overhanging edges of the rim.

Having described my invention, I claim—

1. In a detachable tire the combination of a rim having its edges bent substantially as shown, with a tire-sheath having external beads near its edges for engagement beneath the overhanging edges of the rim, the inner walls of the edges of said sheath being inclined toward the rim, a locking-strip having a groove in its inner face to accommodate the spoke-fastening devices, the sides of said strip tapering toward the rim, and an inflatable core, substantially as and for the purpose specified.

2. In a detachable tire, the combination of a rim having the flattened middle part $a$, the inclined parts $a^5$ and the bent-over but outwardly-inclined edges $a^2$, with a tire-sheath whose edges are provided with external beads and are shaped to externally conform to the recesses formed between the parts $a^5$ and the edge $a^2$ of the rim, the inner surfaces of said beads tapering toward the rim, an inflatable core, and a locking-strip having a groove in its inner face to accommodate the spoke-fastening devices and having its sides tapering toward the rim, which strip will be bent longitudinally by the inflation of the core, and thereby its outer edges will be spread against the inner face of the edges of the sheath, substantially as and for the purpose specified.

3. The combination of a rim having a flattened central portion and portions on each side of said central portion inclined outwardly and upwardly and then inwardly and upwardly to form recesses, a tire-sheath having retaining-beads adapted to engage said recesses, a locking-strip having a groove in its inner face and applied to said rim between the beads of said sheath, and a core within said sheath.

4. The combination of a rim having a flattened central portion and portions on each side of said central portion shaped to form retaining-recesses, a tire-sheath having retaining-beads adapted to engage the said recesses, the inner surfaces of said beads tapering toward the rim, a locking-strip having a groove in its inner face applied to the central portion of the rim between the beads of said sheath and having side walls tapering toward the rim and extended to form wings.

5. The combination of a rim having a flattened central portion and portions on each side of said central portion inclined outwardly and upwardly and inwardly and upwardly to form recesses, a tire-sheath having retaining-beads adapted to engage said recesses, a core within said sheath, and a locking-strip applied to said rim between the beads of said sheath, the side walls of said strip tapering toward the rim and being provided with wings extending said side walls to increase the bearing-surface of said walls on said sheath and to prevent nipping the core between said strip and sheath.

In testimony whereof I hereunto affix my signature in the presence of two witnesses.

ARTHUR H. MARKS.

Witnesses:
E. B. GILCHRIST,
E. L. THURSTON.